US008934891B2

(12) United States Patent
Carmon (10) Patent No.: US 8,934,891 B2
(45) Date of Patent: Jan. 13, 2015

(54) SMALL CELL NETWORK SELF-SYNCHRONIZATION

(75) Inventor: Rafael Carmon, Rishon Lezion (IL)

(73) Assignee: Broadcom Corporation, Irvine, CA (US)

(*) Notice: Subject to any disclaimer, the term of this patent is extended or adjusted under 35 U.S.C. 154(b) by 8 days.

(21) Appl. No.: 13/492,134

(22) Filed: Jun. 8, 2012

(65) Prior Publication Data

US 2013/0281080 A1   Oct. 24, 2013

Related U.S. Application Data

(60) Provisional application No. 61/635,598, filed on Apr. 19, 2012.

(51) Int. Cl.
*H04W 56/00* (2009.01)

(52) U.S. Cl.
USPC ..... 455/422.1; 455/403; 455/411; 455/412.1; 455/561

(58) Field of Classification Search
CPC ...................... H04W 56/0035; H04W 56/0005
USPC ............... 455/422.1, 437, 450; 370/503, 342, 370/350, 328
See application file for complete search history.

(56) References Cited

U.S. PATENT DOCUMENTS

| 7,873,336 | B2 | 1/2011 | Fei et al. |
| 8,792,851 | B2* | 7/2014 | Matsumura et al. ........... 455/403 |
| 2004/0171352 | A1* | 9/2004 | Maeda et al. ............... 455/67.13 |
| 2006/0239238 | A1* | 10/2006 | Fernandez-Corbaton et al. .............................. 370/342 |
| 2006/0245453 | A1 | 11/2006 | Bedrosian |
| 2007/0230510 | A1* | 10/2007 | You et al. ....................... 370/503 |
| 2009/0075661 | A1* | 3/2009 | Takagi ........................... 455/437 |
| 2010/0054237 | A1 | 3/2010 | Han et al. |

FOREIGN PATENT DOCUMENTS

| WO | WO 2009/013238 A1 | 1/2009 |
| WO | WO 2010148981 A1 * | 12/2010 |

OTHER PUBLICATIONS

European Search Report directed to related European Patent Application No. 13 00 1818.7, The Hague, Netherlands, mailed Jun. 5, 2014; 3 pages.
Office Action directed to related Taiwanese Patent Application No. 102110479, mailed Aug. 12, 2014; 8 pages.

* cited by examiner

*Primary Examiner* — David Q Nguyen
(74) *Attorney, Agent, or Firm* — Sterne, Kessler, Goldstein & Fox P.L.L.C.

(57) ABSTRACT

A system, method, and apparatus to facilitate the synchronization of oscillators between members of a Heterogeneous Network (HetNet) to form a self-synchronizing network (SSN). The network members are configured to broadcast information indicative of the reliability of their oscillator. Network members attempt to look for reliable sources such as those originating from a macrocell base station or GPS. If such a source is found, the member cell updates it clock accuracy confidence level number (CACL) to indicate this. Network members also share information regarding the frequency offsets between one another. Every cell member then applies a weighted average function to determine how to update its own oscillator and CACL value accordingly. Cell members can also update their functionality, such as RF power level, in response to varying degrees of CACL values. This operation results in a convergence of all cell members to the most accurate oscillator offset value.

20 Claims, 9 Drawing Sheets

SMALL CELL NETWORK SELF-SYNCHRONIZATION

CROSS-REFERENCE TO RELATED APPLICATIONS

This patent application claims the benefit of U.S. Provisional Patent Application No. 61/635,598, filed Apr. 19, 2012, which is incorporated herein by reference in its entirety.

BACKGROUND

1. Field of Disclosure

This disclosure relates to network communication and, more specifically, to controlling an accuracy of various oscillators within the network.

2. Related Art

Femtocells and small cells are base stations deployed as part of cellular networks. These base stations have a shorter range and transmit at a lower power compared to macrocells that service a much wider area. Small cells and femtocells are therefore deployed in much greater numbers to supplement the cellular network and therefore are more cost sensitive. This type of cellular network having macrocells, small cells, and femtocells is collectively known as a "HetNet" (Heterogeneous Network).

Accuracy and synchronization of various lower cost oscillators of various cell members (femtocells or small cells) has traditionally been solved by using a combination of GPS, macrocell "sniffing", and synchronization through an IP connection utilizing an internet time synchronization protocol such as NTP or IEEE 1588. GPS, although capable of providing an accurate synchronized time signal, generally requires "line of sight" with the satellite source, and performs poorly when the HetNet cells are primarily located indoors or otherwise obstructed from a line of sight view. Macrocell sniffing is a process by which a small cell or femtocell "sniffs" a nearby macrocell over a broadcast channel to update its local clock to match the macrocell clock, which is considered to be a reliable source. However, because femtocells and small cells are often deployed to supplement areas where macrocell coverage is poor or absent, this method does not address situations in which the femtocells and small cells are located outside the macrocell coverage area. Finally, using an IP network synchronization protocol is not always a viable solution either, as the use of such protocols is highly dependent on Internet Service Provider (ISP) QoS, suffers from slow performance, and uses additional bandwidth.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Moreover, terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," home Node B (HNB)," "home access point (HAP)," or the like, are utilized interchangeably in the subject specification and drawings, and refer to a wireless network component or apparatus that serves and receives data, control, voice, video, sound, gaming, or substantially any data-stream or signaling-stream from a set of subscriber stations. It is noted that in the subject specification and drawing, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

The present disclosure provides a method, an apparatus, and a system by which a Heterogeneous Network "HetNet" can broadcast information amongst other cell network members. The information can include an indication of the cell member's confidence level in its own oscillator accuracy and the oscillator frequency itself, as well as additional parameters as to be further discussed below. By the sharing of such information, network cell members can intelligently update their own confidence level and/or calculate their oscillator offsets. These oscillator offset values, in turn, can be used to adjust various oscillator frequencies of the network cell members.

Exemplary Heterogeneous Network System within Macrocell Coverage

Figure 1:
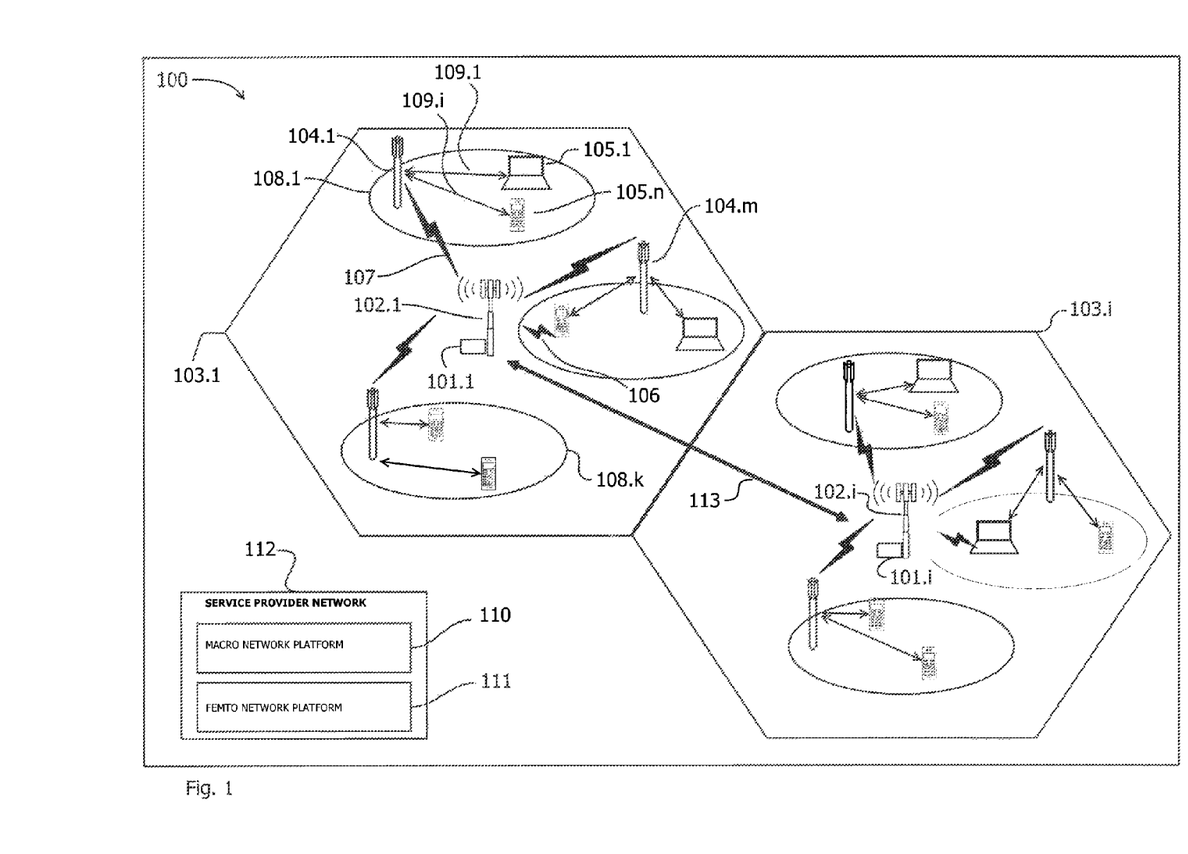
FIG. 1 illustrates a typical macrocell, small cell, and femtocell network of an exemplary HetNet communication system as known in the art.

FIG. 1 illustrates a typical macrocell, small cell, and femtocell network of an exemplary HetNet communication system as known in the art. A wireless environment 100 includes femtocells and/or small cells 108.1 through 108.$k$ within a coverage area of macrocells 103.1 through 103.$i$. The macrocells 103.1 through 103.$i$ provide macro cell coverage that are served by macrocell base stations 101.1 through 101.$i$ and antenna towers 102.1 through 102.$i$. It should be appreciated that the macrocells 103.1 through 103.$i$ are illustrated as hexagons; however, the macrocells 103.1 through 103.$i$ can adopt other geometries generally dictated by deployment or floor plan, geographic areas to be covered (e.g., a metropolitan statistical area (MSA) or rural statistical area (RSA)), and so on. It should also be appreciated that the macrocells 103.1 through 103.$i$ can include a similar and/or dissimilar number of the femtocells 108.1 through 108.$k$ without departing from the spirit and scope of the disclosure.

Macro coverage is generally intended to serve end-user devices 105.1 through 105.$n$. The end-user devices 105.1 through 105.$n$ can include a mobile phone device, laptop, or any suitable other device designed to work in conjunction with a cellular and/or wireless network that will be apparent to those skilled in the relevant art(s) without departing from the spirit and scope of the present disclosure.

An over-the-air wireless link 106 provides macro coverage between the end-user devices 105.1 through 105.$n$ and the macrocell base stations 101.1 through 101.$i$. The wireless link 106 can include a downlink (DL) and/or an uplink (UL), each of which can utilize a predetermined band, licensed or unlicensed, of the radio frequency (RF) spectrum. It is noted that a set of macrocell base stations, associated components, macrocell base station controllers, and wireless links in the set of macrocell base stations form a radio access network (RAN). The RAN, further operating together with a set of femtocell and/or base stations, femtocell associated components, femtocell base station controllers, and femtocell wireless links form a heterogeneous network (HetNet).

Macro network platform 110 is comprised of the interconnections, communications, monitoring, and control of base stations 101.1 through 101.$i$ through appropriate backhaul links 113. The additional equipment responsible for the overall macro network platform functionality is not illustrated in FIG. 1, but will be apparent to those skilled in the relevant art(s). The macro network platform 110 controls a set of base stations from among macrocell base stations 101.1 through 101.$i$ that serve respective network cell members from among the macrocells 103.1 through 103.$i$. Typically, the macrocell base stations 101.1 through 101.$i$ include radio equipment for operation in one or more radio technologies coupled to a corresponding antenna tower 102.1 through 102.$i$ that can serve one or more sectors within its corresponding network cell 103.1 through 103.$i$. The macro base stations 101.1 through 101.$i$ forming the macro network platform 110 can also connect to a service provider network 112 via additional backhaul links. The backhaul links connecting the macrocell base stations 101.1 through 101.$i$ to the service provider network are not shown in FIG. 1. Backhaul links can include wired or wireless links appropriate for the bandwidth required for the network platform that will be apparent to those skilled in the relevant art(s) without departing from the spirit and scope of the present disclosure.

As shown in FIG. 1, the femtocells/small cells 108.1 through 108.$k$, within one or more of the macrocells 103.1 through 103.$i$ which are served by respective femtocell access points 104.1 through 104.$m$, can be deployed. While in illustrative wireless environment 100 three femtocells are deployed per macrocell, this is for illustrative purposes only. Those skilled in the relevant art(s) will recognize that the macrocells 103.1 through 103.$i$ can include a different number of femtocells 108.1 through 108.$k$ without departing from the spirit and scope of the present disclosure. For example, the macrocells 103.1 through 103.$i$ can include deployments with substantive femto AP density, for example, $10^4$-$10^7$ femtocells 108.1 through 108.$k$ per network cell 103.1 through 103.$i$.

Typically, the femtocell access points 104.1 through 104.$m$ serve their respective end-user devices 105.1 through 105.$n$ within a confined coverage area of the femtocells 108.1 through 108.$k$. The femtocell access points 104.1 through 104.$m$ and their respective end-user devices 105.1 through 105.*n* communicate via respective wireless communication links 109.1 through 109.1, which encompasses a downlink (DL) and an uplink (UL). The femtocell access points 104.1 through 104.*m* can communicate with their respective macrocell base stations 101.1 through 101.*i* through a wireless communication link 107. A femto network platform 111 within the core service provider network 112 can control such service, in addition to mobility handin, handout, and/or handover between the macrocells 103.1 through 103.*i* and the femtocells 108.1 through 108.*k*, as well as registration and provisioning of the femtocell access points 104.1 through 104.*m*. Control, or management, is facilitated by one or more backhaul links that connect the femtocell access points 104.1 through 104.*m* with the femto network platform 111.

The macrocell base stations 101.1 through 101.*i* and the femtocell access points 104.1 through 104.*m* use a system of control channels over the wireless link 106, the wireless link 107, and/or the wireless communication links 109.1 through 109.1. Typically, the control channels send and receive control channel information regarding configuration and arrangement of the macrocell base stations 101.1 through 101.*i*, the femtocell access points 104.1 through 104.*m*, and/or the end-user devices 105.1 through 105.*n*. For example, the control channel information allows the macrocell base stations 101.1 through 101.*i* and the femtocell access points 104.1 through 104.*m*, to share information, for example, Location Area Identity (LAI), a list of neighboring cells that should be monitored by the macrocell base stations 101.1 through 101.*i*, the femtocell access points 104.1 through 104.*m*, and/or end-user devices 105.1 through 105.*n*, a list of frequencies, cell identity, power control indication, DTX permitted settings, access control, CBCH description, clock accuracy confidence level, free running oscillator range, and oscillator frequency. The clock accuracy confidence level, free running oscillator range, and the oscillator frequency is to be further discussed in detail below. Typical control channels can include Broadcast Control Channels (BCCH), Common Control Channels (CCCH), and Dedicated Control Channels (DCCH); however, those skilled in the relevant art(s) will recognize that other types of control channels can be used without departing from the spirit and scope of the present disclosure.

Exemplary Base Station Communication

Figure 2:
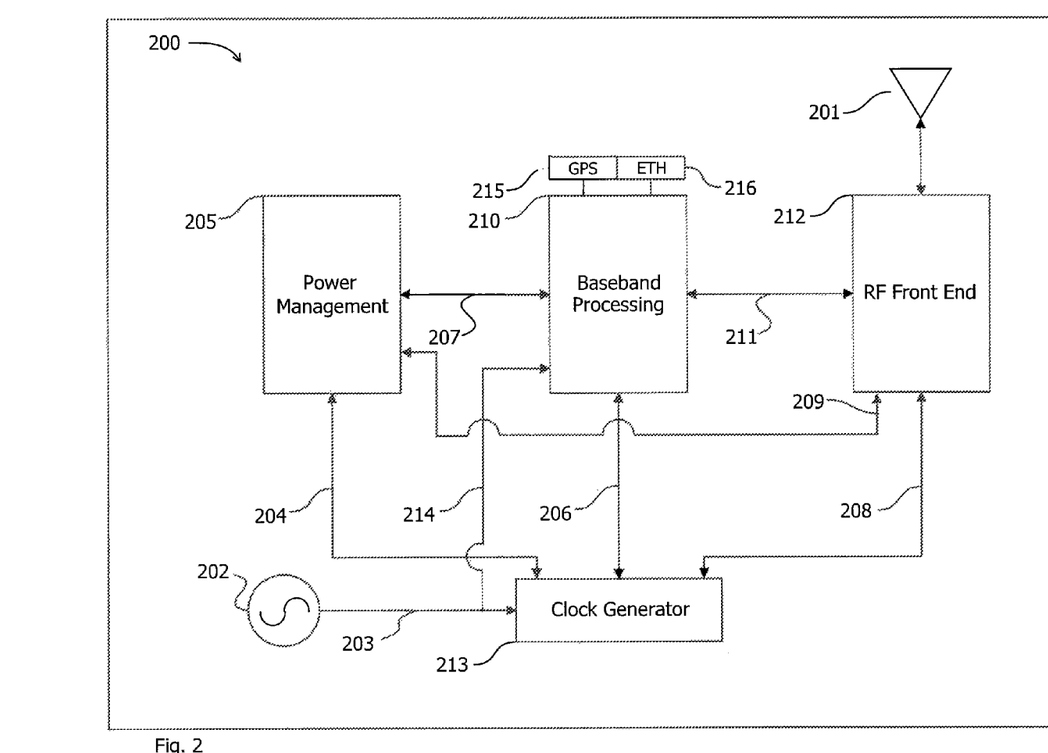
FIG. 2 illustrates an exemplary base station that can be used within the wireless environment according to an embodiment of the present disclosure.

FIG. 2 illustrates an exemplary base station that can be used within the wireless environment according to an embodiment of the present disclosure. A base station 200 provide communications between one or more end user devices, such as one or more of the end-user devices 105.1 through 105.*n*, and a service provider such as the core service provider network 112 to provide an example. The base station 200 includes an oscillator 202, a power management module 205, a baseband processing module 210, a radio frequency (RF) front end 212, and a clock generator 213. Those skilled in the relevant art(s) will recognize that the femtocell base station 200 as to be described below can be suitable for any heterogeneous network for use in the previously mentioned cellular network system. For example, the base station 200 can represent an exemplary embodiment of one of the macrocell base stations 101.1 through 101.*i*, and/or of one of the femtocell access points 104.1 through 104.*m*.

The RF front end 212 typically performs analog signal processing on various signals received from an antenna 201 and/or various signals provided to the antenna 201. This analog signal processing can include filtering, amplification, frequency translation, analog to digital conversion, digital to analog conversion, and/or any other suitable analog signal processing that will be apparent to those skilled in the relevant art(s) without departing from the spirit and scope of the present invention.

The baseband processing module 210 typically performs digital signal processing on various signals received from the RF front end 212 and/or various signals provided to the RF front end 212. This digital signal processing can include demodulation, modulation, encoding, decoding, filtering and/or any other suitable digital signal processing that will be apparent to those skilled in the relevant art(s) without departing from the spirit and scope of the present invention. The baseband processing module 210 can additionally be configured to send frequency offset synchronization information to the clock generator 213 via connection 206 to adjust or offset oscillator 202 in response to a GPS signal received through a GPS receiver 215, a macrocell sniffing signal received through the antenna 201, and/or a network time protocol signal received through a broadband connection connected to an Ethernet port 216.

The power management module 205 provides various DC and/or AC power sources to appropriate circuit components the oscillator 202, the baseband processing module 210, the RF front end 212, and/or the clock generator 213. The power management module 205 utilizes connections 204, 207, and 209 to provide these DC and/or AC power sources, monitor power consumption of the oscillator 202, the baseband processing module 210, the RF front end 212, and/or the clock generator 213, regulate voltage and current thresholds and safety cutoffs, and provide auxiliary power switching options such as battery backup power, for example.

Typically, the power management module 205, the baseband processing module 210, the RF front end 212, and/or the clock generator 213 require various clocking signals for operation. Properly timed clock signals allow various circuit components of these modules to properly communicate with one another and to process voice and data packets. For example, various clocking signals are additionally used in mixing steps in the RF front end 212. These clocking signals are generated in the clock generator circuitry 213 and provided to the baseband processing module 210 and RF front end 212 via connections 206 and 208 to perform these functions.

It is desirable that the macrocell base stations 101.1 through 101.*i*, the femtocell access points 104.1 through 104.*m*, and/or the end-user devices 105.1 through 105.*n* to have accurate clock frequencies in order to transmit on accurate RF frequencies, to meet the RF spectral masks regulatory requirements, to provide correct modulation and demodulation of voice and data packets, and to provide adequate voice quality. For example, the carrier frequency of the macrocell base stations 101.1 through 101.*i*, the femtocell access points 104.1 through 104.*m*, and/or the end-user devices 105.1 through 105.*n* must be accurate typically within a range of ±0.25 ppm (parts-per-million) for the femtocell access points 104.1 through 104.*m* and the end-user devices 105.1 through 105.*n* to ±0.05 ppm for the macrocell base stations 101.1 through 101.*i*. Furthermore, clock synchronicity between the macrocell base stations 101.1 through 101.*i*, the femtocell access points 104.1 through 104.*m*, and the end-user devices 105.1 through 105.*n* allows the end-user devices 105.1 through 105.*n* to lock onto its appropriate macrocell base stations 101.1 through 101.*i* or femtocell access points 104.1 through 104.*m* and to support hand-ins, namely macrocell to femtocell service transfer, hand-outs, namely femtocell to macrocell service transfer, and/or hand-offs, namely macrocell to macrocell or femtocell to femtocell service transfers.

Because the accuracy of clock signals between the macrocell base stations 101.1 through 101.i, the femtocell access points 104.1 through 104.m, and/or the end-user devices 105.1 through 105.n is desirable, clock generator circuitry 213 can be designed to adjust a frequency of a signal generated by oscillator 202 fed via connection 203. The oscillator 202 can include, but is not limited to, several well-known manufactured types such as an Analog Temperature Controlled Crystal Oscillator (ATCXO), a Digital Temperature Controlled Crystal Oscillator (DTCXO), an Evacuated Miniature Crytal Oscillator (EMXO), a Global Positioning System Disciplined Oscillator (GPSDO), a Microcomputer Compensated Crystal Oscillator (MCXO), an Oven-Controlled/Voltage-Controlled Crystal Oscillator (OC/VCXO), an Oven-Controlled Crystal Oscillator (OCXO), a Rubidium-Crystal Oscillator (RbXO), a Temperature-Compensated/Voltage-Controlled Crystal Oscillator (TCVCXO), a Temperature Compensated Crystal Oscillator (TCXO), a Tactical Miniature Crystal Oscillator (TMXO), a Temperature Sensing Crystal Oscillator (TSXO), a Voltage-Controlled Temperature Crystal Oscillator (VCTCXO), or a Voltage-Controlled Crystal Oscillator (VCXO).

Crystal oscillators are manufactured with a specific tolerance provided in ppm. A typical oscillator will therefore experience frequency drift within these tolerance levels. The baseband processing module 210 can further be configured to measure and to track a free running range of the oscillator 202 within this tolerance through connection 214, for example, and store this information in local RAM, non-volatile memory, EEROM, firmware, or other storage means. By way of example, the baseband processing module 210 can be configured to begin tracking this range at initialization, store the free running range in an addressable block of memory locations, and update the memory periodically, continuously, or over a predetermined interval.

The baseband processing module 210 can also be configured to communicate information through the RF front end 212 or over the Ethernet port 216. This information can include, but is not limited to, frequency range, an average derived from the range over a specified time interval, or an instantaneous measurement of the frequency of oscillator 202. Furthermore, any other parameters in accordance with the exemplary embodiment of the invention, such as clock accuracy confidence levels, and the average and/or instantaneous oscillator offset values which are discussed in greater detail below, can be similarly provided through the RF front end 212 or the Ethernet port 216. The RF front end 211 and the baseband processing module 210 can further be configured to receive substantially similar information over the antenna 201 that is likewise broadcasted from other macrocell base stations, femto AP's, and/or end-user devices.

Exemplary Heterogeneous Network System Partially Outside Macrocell Coverage

Figure 3:
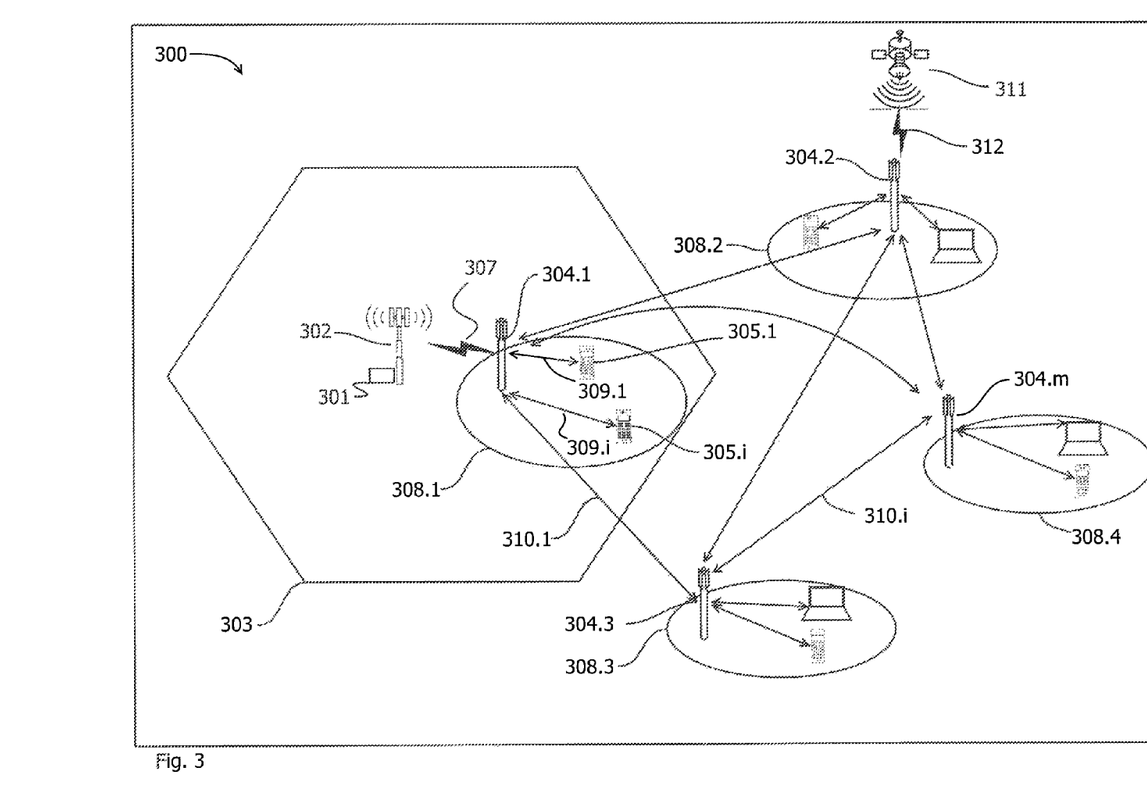
FIG. 3 illustrates a second wireless environment that includes macrocells and femtocells/small cells for wireless coverage according to an embodiment of the present disclosure.

FIG. 3 illustrates a second wireless environment that includes macrocells and femtocells/small cells for wireless coverage according to an embodiment of the present disclosure. A wireless environment 300 includes a first group of femtocells 308.1 through 308.k within a coverage area of a macrocell 303 and a second group of the femtocells 308.1 through 308.k outside of the coverage area of the macrocell 303. The femtocells 308.1 through 308.k are served by respective femtocell access points 304.1 through 304.m. Although only a single macrocell 303 and four femtocells 308.1 through 308.4 are illustrated in FIG. 3, this is for illustrative purposes. Those skilled in the relevant art(s) will recognize that a different number of the femtocells 308.1 through 308.k may be included within the first group and/or the second group without departing from the spirit and scope of the present invention.

As shown in FIG. 3, only one of the femtocells 308.1 through 308.k is within a coverage area of the macrocell 303. For example, this can occur when several of femtocell access points 304.1 through 304.m are installed indoors, such as femtocell 304.1 is installed near a window on the edge of coverage provided by the macrocell 303 to provide an example. The femtocell 308.2 is not within the coverage area of the macrocell 303, but femtocell 308.2 is installed in a location where it is capable of receiving a GPS signal 312 transmitted from one or more GPS satellites 311. The femtocells 308.3 and 308.4 are not within the coverage area of the macrocell 303 or the GPS signal source 312.

The femtocell access points 304.1 through 304.m are capable of communicating with end-user devices 305.1 through 305.i through wireless links 309.1 through 309.i. The femtocell access points 304.1 through 304.m are also capable of communicating with one another through wired means such as an Ethernet network controller system or other wireless means to provide some examples. This communication can be provided in the form of a wireless link 307 from a macrocell base station 301 and its associated antenna tower 302 to one or more of the femtocell access points 304.1 through 304.m and/or end-user devices 305.1 through 305.i via wireless links 310.1 through 310.i.

An access point, such as one of the femtocell access points 104.1 through 104.m and/or one of the femtocell access points 304.1 through 304.m to provide some examples, a base station, such as one of the macrocell base stations 101.1 through 101.i and/or the macrocell base station 301, is capable of calculating, transmitting, and/or receiving a clock accuracy confidence level (CACL). The CACL is associated with a clock source used by the access point and/or the base station and programmed according to a predetermined range of values that is universally recognized by each member of a self-synchronizing network. Because the mathematics is simplified using a simple analog scale of 0 to 1, this range of values is used as an example throughout the disclosure. However, it should be noted that the invention is not so limited, and this value can be set according to a customized range, positive or negative integer values, analog or digital values, etc.

Further in accordance with an embodiment of the invention, the CACL is indicative of the reliability of a particular clock source for a particular access point and/or base station. As an example, because the femtocell access point 304.1 is within the range of macrocell 303, it would be able to offset its oscillator to synchronize with the macrocell base station 301, using a macrocell "sniffing" method over link 307. Because macrocell base stations are required to have highly accurate oscillators, the femtocell access point 304.1 would assign a high value to its CACL, for example, a value of 1. The femtocell access point 304.2 is likewise able to offset its oscillator according to the GPS signal 312, which is considered a reliable source as it is generally synchronized with an atomic clock source signal. Therefore, the CACL of both the femtocell access points 304.1 and 304.2 would reflect the reliability of their corresponding frequency sources.

This CACL value is communicated with various cell members within a wireless environment, such as the wireless environment 100 and/or the wireless environment 300 to provide some examples, along with other parameters such as oscillator frequency, for example. In some situations, several of the femtocell access points 304.1 through 304.m, may not have access to a reliable clock source such as a macrocell, GPS, or network time protocol. Accordingly, these femtocell access points would process the lack of such a source as having a low reliability oscillator source, and would assign a low value to its CACL, for example, a value of 0.

Figure 4:
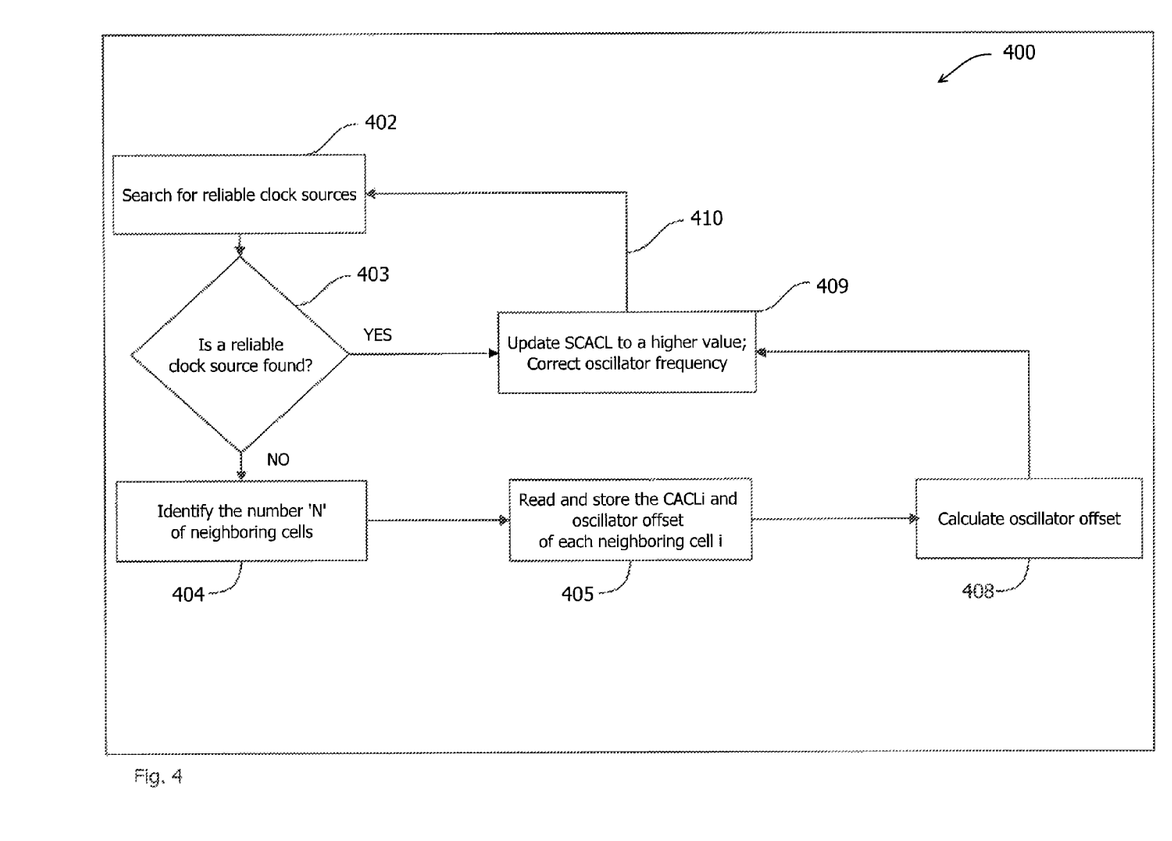
FIG. 4 is a flowchart of exemplary operational steps for calculating a clock accuracy confidence level (CACL) according to an aspect of the present invention.

A Flowchart Representing the Typical Processing Steps for a Member Cell of an Exemplary Self-Synchronizing Network FIG. 4 is a flowchart of exemplary operational steps for calculating a clock accuracy confidence level (CACL) according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 4. It should be noted that although the term "neighbor" cell is frequently used throughout the disclosure, a "neighbor" cell need not be directly adjacent to one another, or even having overlapping cell coverage.

At step 402, the operational control flow searches for a reliable clock source in an attempt to synchronize with other cell members within a wireless environment, such as the wireless environment 100 and/or the wireless environment 300 to provide some examples. The reliable clock source can be provided by GPS, macrocell "sniffing", and/or synchronization through an IP connection utilizing an internet time synchronization protocol such as NTP or IEEE 1588. The operational control flow can be implemented by an access point, such as one of the femtocell access points 104.1 through 104.m and/or one of the femtocell access points 304.1 through 304.m to provide some examples, a base station, such as one of the macrocell base stations 101.1 through 101.i and/or the macrocell base station 301.

At step 403, the operational control flow determines whether a reliable clock has been found. If one is found, the operational control flow will update its own CACL from a value which would be indicative of a low reliability (near 0) to a value reflecting a higher reliability (such as 1) at step 409. The operational control flow would also adjust its oscillator frequency to synchronize it with the known reliable source from step 402. Otherwise, if the operational control flow member does not find a reliable clock source after a predetermined elapsed time, which can be customized and varied based on the particular application, the operational control flow proceeds to step 404.

At step 404, the operational control flow identifies neighboring various cell members N within the wireless environment.

At step 405, the operational control flow gathers various CACL values from the neighboring various cell members.

discussed further below. Every cell member receives the corresponding CACL and oscillator offset values from neighboring various cell members N, and then reads and stores those values at step 405.

At step 408, the operational control flow uses the various CACL values from step 405 as part of a weighted average function to update its own CACL value (SCACL) and/or its oscillator frequency. An example of such an equation to determine the updated offset, denoted below as $M_0$, is as follows:

$$M_0 = K(1 - SCACL) \sum_{i=1}^{N} \left( \frac{CACLi}{N} \right) Mi \quad (1)$$

where K represents a constant value which controls the convergence speed for a specific application based on factors such as the number of cells in a network, available bandwidth, the processing speed of each cell, the number of known reliable cells, etc., SCACL represents a particular member cell's own CACL, or Self Clock Accuracy Confidence Level, CACLi represents the Clock Accuracy Confidence Level of a number of neighboring various cell members i through N, and Mi represents the oscillator offset values of a number of neighboring various cell members i through N as compared to its own and derived from the sniffing operaion. At step 409, the operational control flow updates its own CACL (SCACL) and adjusts its oscillator frequency. The operational control typically updates, namely increases, it own CACL after adjusting its oscillator frequency. The operational control flow can revert back to step 402, as shown by operational control flow path 410.

As an example, equation (1) is used with reference to FIG. 3 to accurately demonstrate how the oscillator of femtocell accesspoint 304.3 can be corrected according to an embodiment of the invention. Assuming that K=1, N=3, femtocell accesspoints 304.1 and 304.2 each have SCACL=1 and an oscillator value of 1,919,997 KHz, and femtocell accesspoint 304.3 and 304.4 initially have SCACL=0.1, and oscillator values of 1,919,900 kHz and 1,919,850 kHz yielding Mi values of +97 kHz, +97 kHz, and −50 kHz, between femtocell accesspoint 304.3 and femtocell accesspoint 304.1, femtocell accesspoint 304.2, and femtocell accesspoint 304.4, respectively. The offset value would be calculated as follows:

$$M_{304.3} = 1(1 - SCACL_{304.3}) \sum_{i=1}^{N} \left( \frac{CACLi}{N} \right) Mi$$

$$M_{304.3} = (.9) \frac{\{[(CACL_{304.1})(+97 \text{ kHz})] + [(CACL_{304.2})(+97 \text{ kHz})] + [(CACL_{304.4})(-50 \text{ kHz})]\}}{3}$$

$$M_{304.3} = (.9) \frac{\{[(1)(+97 \text{ kHz})] + [(1)(+97 \text{ kHz})] + [(.1)(-50 \text{ kHz})]\}}{3}$$

$$M_{304.3} = +56.70 \text{ kHz}$$

Every cell member within the wireless environment is configured to run operational control flow 400. Therefore, neighboring various cell members N each concurrently calculate respective oscillator offset values and their self CACL (SCACL) values associated with steps 408 and 409, which are This results in an Oscillator Offset Correction for femtocell accesspoint 304.3=+56.70 kHz. These results demonstrate the femtocell accesspoint, 304.4, the most unreliable, does not impact the calculated value nearly as much as the other two femtocell accesspoints 304.1 and 304.2, as the weighted average offset value of +56.7 kHz is much closer to the correct offset value required (97 kHz) as a straight average would be (48 kHz). The femtocell accesspoint, 304.3 can update its oscillator value in step 409 to 1,919,956.7 kHz, which is much closer to the reliable clocks in femtocell accesspoints 304.1 and 304.2. It should be noted that this process 400 can be dynamic and continuous. Therefore, the process 400 could be allowed run continuously, and the clocks of the femtocell accesspoints 304.3 and 304.4 would thereby continue to update and converge to become closer with each iteration to match the oscillator values of the most reliable clock sources. The femtocell accesspoint 304.3 also updates its SCACL value to a higher value to reflect this change. Furthermore, the operational control flow can also be configured to store a log of such historical convergence information in a non-volatile memory location locally or on a network server, bridge, controller, etc. In this way, a cell member would be able to quickly offset its oscillator upon initialization after a power failure, for example, by correlating the best recorded SCACL value and the associated oscillator offset from the logged data.

The operational control flow can be customized and programmed as needed to update SCACL values based on any number of parameters. Factors that can influence the SCACL value can be the number of overall cell members, the number of higher reliability neighboring cells in the wireless environment, overall member uptime, and number of iterations, for example. Those skilled in the art will appreciate the fact that different ranges and different weighting equations can be utilized to provide better resolution and more accuracy for networks based on size of the wireless environment and the number of factors considered.

Figure 5:
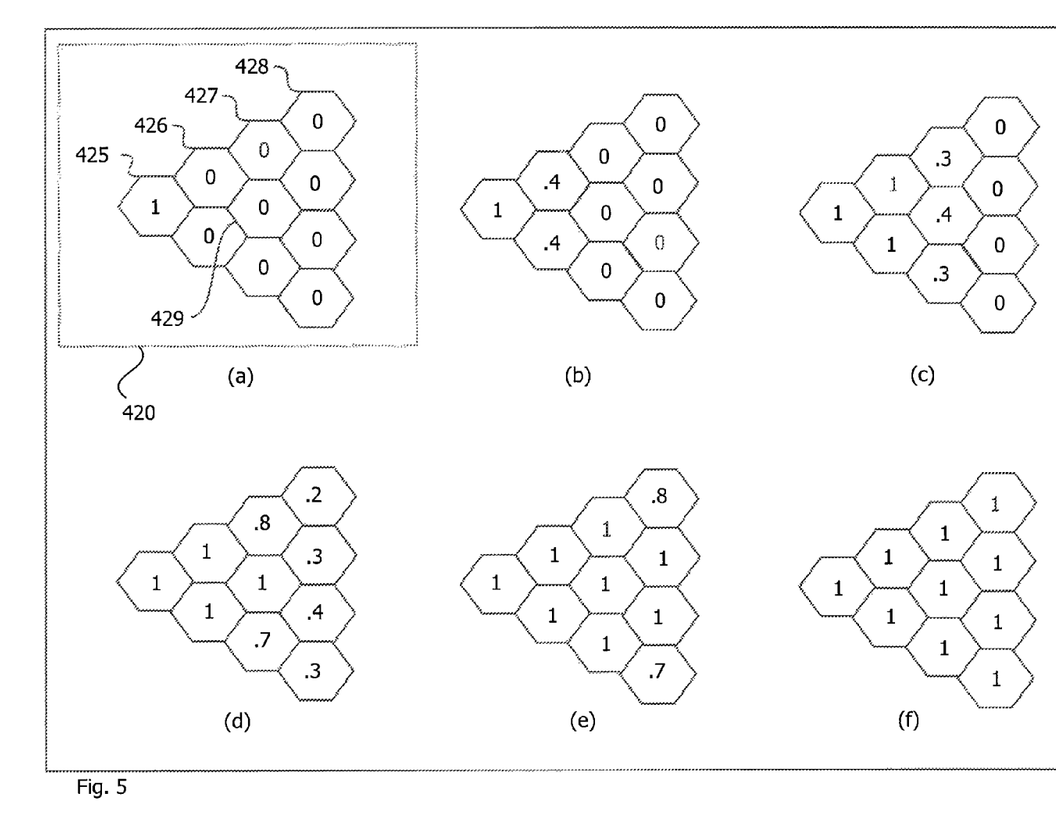
FIG. 5 illustrates an operation of a self-synchronization wireless environment in accordance with a first embodiment of the invention.

A Propagation Chart Representing Synchronization Steps in an Exemplary Self-Synchronizing Network with a High Accuracy Cell Initially Located at the Edge of the Network Coverage FIG. 5 illustrates an operation of a self-synchronization wireless environment in accordance with a first embodiment of the invention. Various cell members of a wireless environment are illustrated as hexagons and constitute a wireless environment 420. For purposes of clarity, the cell members constituting 420 are illustrated as physically adjacent to one another and should be considered as having overlapping coverage between adjacent cell members. However, as previously discussed in this disclosure, physical proximity of the cell members is not required according to aspects of the invention, nor is wireless communication amongst the members needed for the SSN to function. The wireless environment 420 can be any shape or size, and cell members can have various communication ranges that are different from one another based on transmission power, amplifier gain, antenna type, number of antennas, antenna gain, etc. The wireless environment 420 can represent an exemplary embodiment of the wireless environment 100 and/or the wireless environment 300.

The wireless environment 420 is illustrated and organized such that four columns, 425 through 428, are each associated with vertical cell members. The leftmost column 425 has one cell member, and the rightmost column has 4 cell members. Single member of 425 is capable of communicating with both cell members in column 426, cell members in column 426 are likewise capable of communicating with cell members in column 425 and cell members in column 427, etc. Center cell member 429, part of column 427, is capable of communicating with the 6 adjacent cell members on each hexagonal side, two of each in columns 426, 427, and 428.

The wireless environment 420 is shown progressing through steps of convergence (a) through (f). Each step indicates the CACL value associated with each cell member. Upon initialization at step (a), the cell member associated with 425 broadcasts information that indicates its oscillator is very reliable (i.e., CACL=1). The other cell members indicate that their oscillators are not reliable (CACL=0). Cell member 425 can be a macrocell base station, or it can be a femtocell access point which has locked onto a macrocell base station or a GPS signal as previously discussed. The cell member 425 can have an advantageous location within the wireless environment 420 which allows it to do so, such as the edge of the wireless environment 420 near a window, for example.

As the convergence process of the wireless environment 420 continues, the CACL values of each member cell update to indicate the reliability of each member's oscillator based on nearby cell members. In step (b), the members in column 426 update to a value of 0.4 to indicate communication and synchronization with cell member 425. This step continues through step (c). It should be noted that in step (d), center cell member 429 adjusts its CACL value faster than the other adjacent members in column 427. This occurs because center cell 429 is adjacent to more cells with a reliable CACL value (both members of column 426) versus the upper and lower members of column 427 which communicate with only one respective cell in column 426. These steps continue through step (f), which indicates the wireless environment 420 that is fully synchronized with every member indicated a very reliable oscillator frequency.

Figure 6:
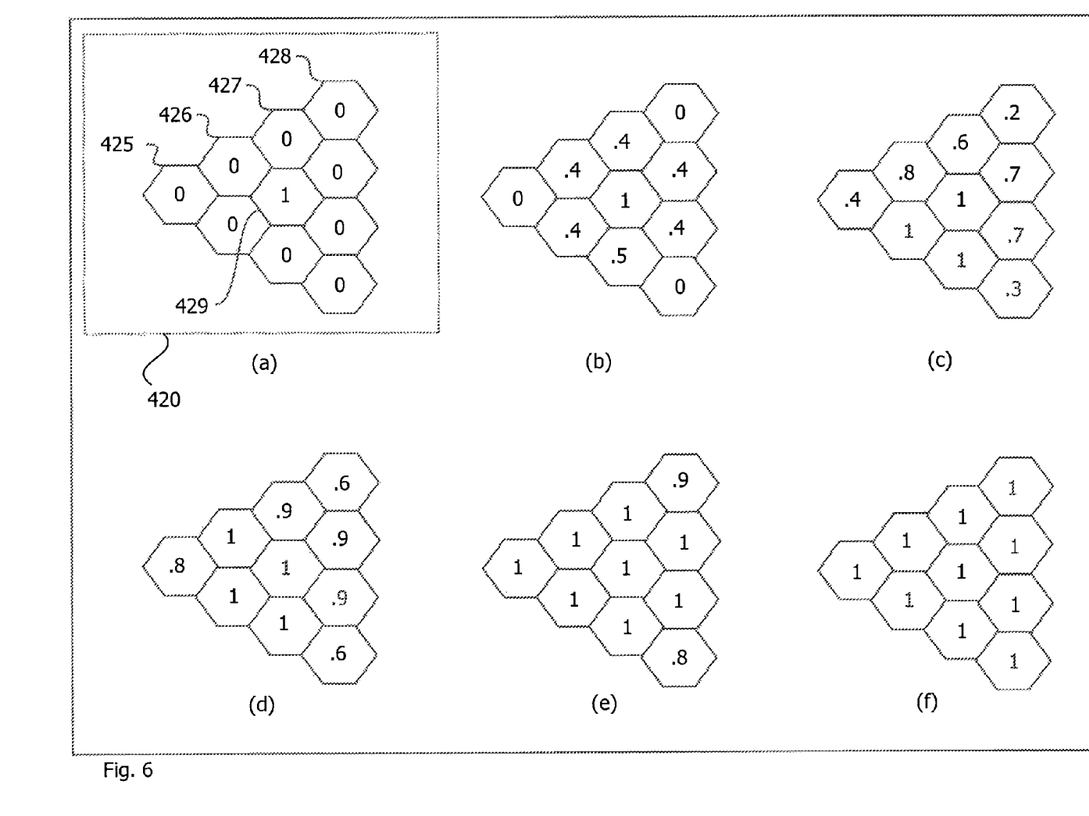
FIG. 6 illustrates an operation of the self-synchronization wireless environment in accordance with a second embodiment of the invention.

A Propagation Chart Representing Synchronization steps in an exemplary self-Synchronizing Network with a High Accuracy Cell Initially Located at the Center of the Network Coverage FIG. 6 illustrates an operation of the self-synchronization wireless environment in accordance with a second embodiment of the invention. In this instance, center cell member 429 is the first cell in the wireless environment 420 to obtain a reliable CACL value. This can be from analysis of the convergence history log, an advantageous location allowing cell member 429 to lock onto a reliable source, or signal received through a network controller, for example. It should be noted that the center cell member 429 can also have a higher CACL due to the fact that it communicates with additional neighboring cell members, even if those members themselves do not have reliable oscillator sources, which will be discussed in greater detail with reference to FIG. 7.

Steps (a) through (f) illustrate the updating procedure associated with each cell member's CACL value throughout the convergence procedure. Similar to FIG. 5, the CACL values of each member cell are shown as propagating outward from the most reliable member until the wireless environment 420 is synchronized in step (f).

Figure 7:
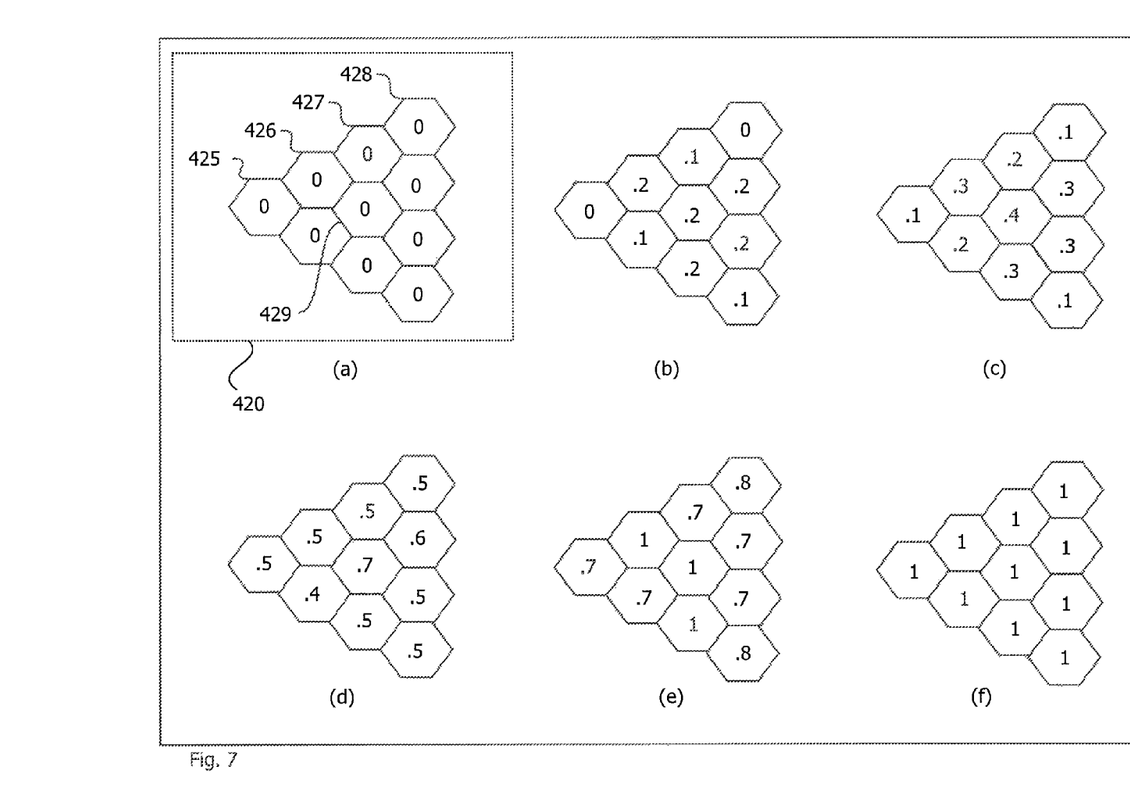
FIG. 7 illustrates an operation of the self-synchronization wireless environment in accordance with a third embodiment of the invention.

A Propagation Chart Representing Synchronization Steps in an Exemplary Self-Synchronizing Network without an Initial High Accuracy Cell Network Member FIG. 7 illustrates an operation of the self-synchronization wireless environment in accordance with a third embodiment of the invention. In FIG. 7, the wireless environment 420 initially starts at step (a), in which no cell member has found a reliable oscillator source, and each CACL value is set to 0. This might be the case, for example, when a new set of femto cell access points installed at an indoor location, no convergence history has yet to be recorded, and none of the cell members have access to a macrocell network. GPS, or broadband network time information. The wireless environment 420 can represent an exemplary embodiment of the wireless environment 100 and/or the wireless environment 300.

It should be noted that crystal oscillator sources have manufacturing tolerances as previously discussed in this disclosure. Although each crystal oscillator component is manufactured to resonate at a specific nominal frequency, limitations exist in the manufacturing process. These limitations result in a tolerance specification which provides the range over and under the nominal frequency in which a particular manufactured crystal oscillator can vary, generally provided as ±ppm (parts-per-million) from the nominal design frequency. Crystal oscillator tolerances conform to Gaussian (bell curve) and uniform distributions. Therefore, with a given sample number of oscillators, a typical distribution curve will indicate an increased number of oscillators are manufactured which oscillate closer to the accurate design frequency, with fewer outlying oscillators closer to the edges of the manufactured tolerance specifications. It is an aspect of the invention to take advantage of these said distributions amongst groups of oscillators.

Taking the manufacturing distribution information in reference to FIG. 7, the number of overall cell members will directly impact the resulting overall oscillator accuracy. Although the example provided in FIG. 7 is a wireless environment 420 with only 10 members, a typical wireless environment 420 can have a far greater number. Applying this reasoning through the illustration in FIG. 7, it is observed that, over time, center cell member 429 is the first member to obtain a reliable clock source as indicated in step (e). As is the case in FIGS. 5-6, the additional adjacent members shared by center cell member 429 speeds the convergence process by taking advantage of the additional members within range.

Without a known reliable source, the wireless environment 420 is still able to converge to have reliable oscillators even without a single reliable source upon initialization. This is due to the fact that, as additional members communicate and process neighboring cell CACL and oscillator offset data, the weighted average function simply converges to the average value of the distribution curve. The result of such a calculation reflects this accuracy because the average is, in fact, the center of the distribution curve, and therefore the closest possible frequency to the nominal design frequency.

Figure 8:
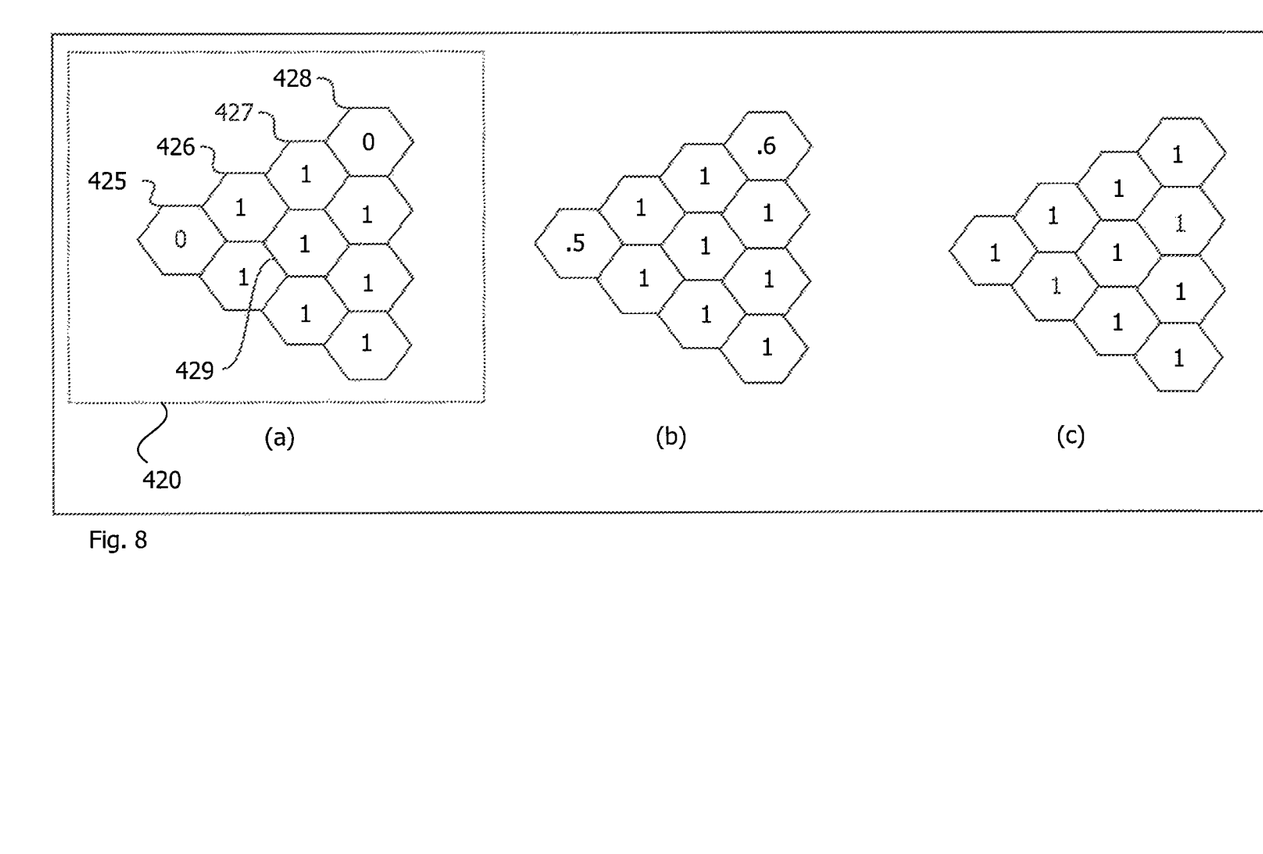
FIG. 8 illustrates an operation of the self-synchronization wireless environment in accordance with a fourth embodiment of the invention.

A Propagation Chart Representing Synchronization Steps in an Exemplary Self-Synchronizing Network which is Substantially Synchronized Prior to the Introduction of New Network Cell Members FIG. 8 illustrates an operation of the self-synchronization wireless environment in accordance with a fourth embodiment of the invention. In FIG. 8, the majority of the network is already synchronized as shown by cell member's CACL indicated as a '1'. New cell members are then installed, which initially have a CACL value of '0'. An example of adding new cell members would be a situation in which a wireless environment exists, and additional cell members are needed to improve or supplement coverage at a later date. The newly added cell members could be located anywhere within the wireless environment 420, and are not limited to edge locations. Steps (a) through (c) show the newly added cell members, which each have two adjacent neighbor cells, quickly converge to a reliable oscillator value as each neighboring cell has a high CACL value associated with it. The wireless environment 420 as illustrated in FIG. 8 therefore advantageously brings newly added cell members to the proper oscillator values quickly. Step (c) indicates the fully synchronized wireless environment 420.

Figure 9:
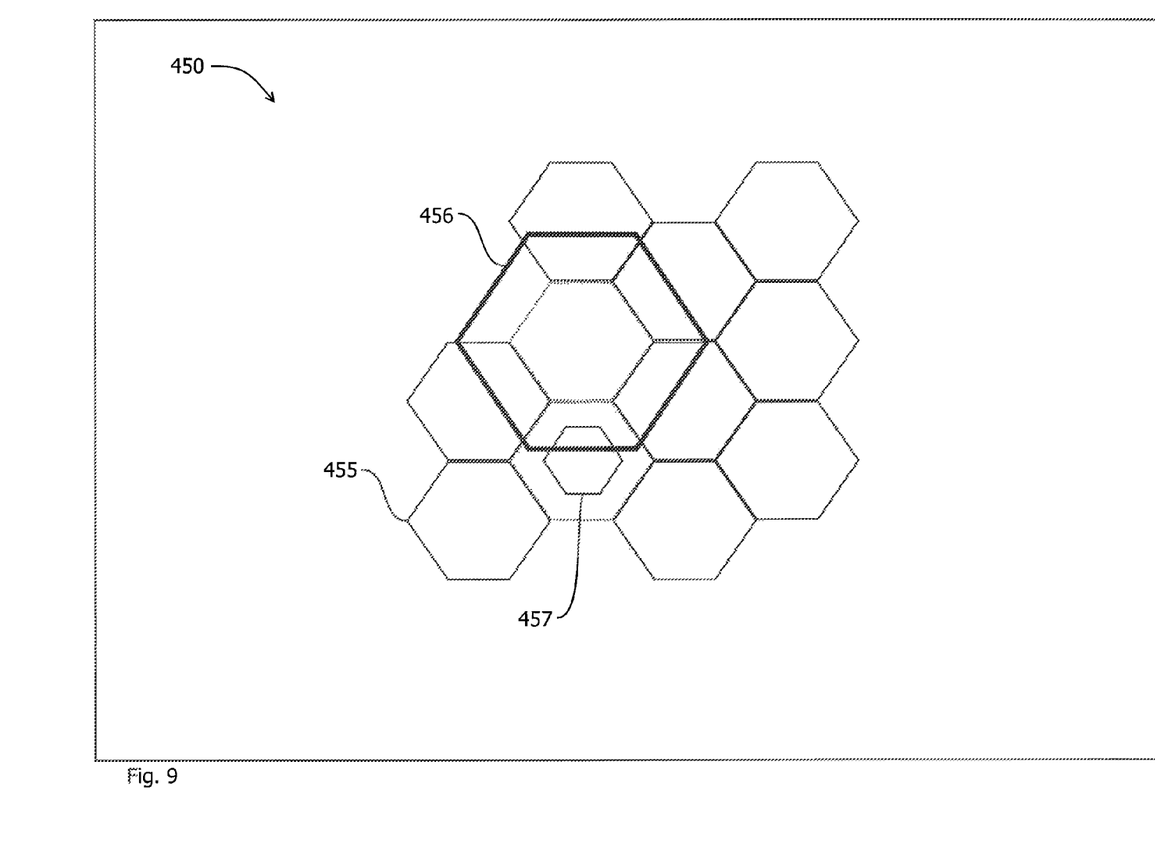
FIG. 9 illustrates additional functionality of the self-synchronization wireless environment in accordance with a fifth embodiment of the invention.

A Chart Representing Power Output of a Cell Member as a Function of Oscillator Accuracy FIG. 9 illustrates additional functionality of the self-synchronization wireless environment in accordance with a fifth embodiment of the invention. A wireless environment 450 is an illustration of a typical coverage map, each hexagonal cell is associated with a cell member, such as a femtocell access point, for example. Each cell member is capable of communicating information to other network members as previously discussed. One example of such a parameter is each cell member's transmit power. The transmit power level can be controlled in each member's processing, software, firmware, hardware, and/or code according to a predetermined set of algorithms or instructions. Every cell member has a nominal coverage area 455 which is associated with a nominal RF power output. A wireless environment 450 may advantageously increase the power output for cell members which have a highly reliable clock source, such as members which have successfully locked onto a macrocell base station, for example. FIG. 9 illustrates an example of a cell member which has increased its power output in response to acquiring a high CACL value to coverage area 456. In contrast, another cell member can respond in an opposite manner by appropriately reducing its power output as shown by coverage area 457 while its CACL value remains low.

Controlling the transmit power to an individual cell member as a function of the CACL value provides a twofold benefit: it allows more end-users to take advantage of the known reliable cell member and avoid problems associated with oscillator inaccuracy (dropped calls, for instance), and increases the chances of nearby member cells which might otherwise be out of range to successfully communicate with a reliable cell member. Increasing and decreasing the transmit power is only one example of adapting members of a wireless environment as a function of CACL, and the disclosure should not be interpreted as limiting the invention to this specific example. Those skilled in the applicable art(s) will appreciate that other methods can be used such as increasing and decreasing amplifier gains, controlling the antenna beam pattern, switching between one or several antennas to control antenna gain, using an antenna diversity system, limiting the maximum data rates, providing different types of service offerings, changing the modulation technique, and switching communication channels and/or frequencies to prevent wireless interference, for example.

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments.

What is claimed is:

1. A method for a self-synchronizing network, the self-synchronizing network including a plurality of base stations coupled to one another, the method comprising:

receiving, by a first base station from among the plurality of base stations, frequency information relating to a second base station from among the plurality of base stations, the frequency information including an indication relating to a reliability of the frequency information;

calculating, by the first base station, an offset frequency value based on the frequency information; and adjusting, by the first base station, an oscillator frequency value based on the offset frequency value.

2. The method of claim 1, wherein the frequency information comprises:
a second offset frequency value corresponding to the second base station, and wherein the receiving the frequency information comprises:
receiving the second offset frequency value using the control channel.

3. The method of claim 1, wherein the receiving the frequency information comprises:
receiving a clock accuracy confidence level (CACL) scaled value indicating a range of reliability of an oscillator frequency corresponding to the second base station.

4. The method of claim 1, wherein the second base station is from among a plurality of second base stations, and wherein the calculating comprises:
calculating the offset frequency value by evaluating:

$$M_0 = K(1 - SCACL) \sum_{i=1}^{N} \left(\frac{CACLi}{N}\right) Mi,$$

where:
$M_0$=an oscillator frequency offset corresponding to the first base station;
SCACL=a self clock accuracy confidence level (SCACL) scaled value indicating a range of reliability of an oscillator frequency corresponding to the first base station;
$M_i$=an $i^{th}$ second oscillator frequency offset corresponding to an $i^{th}$ second base station from among the plurality of second base stations;
$CACL_i$=an $i^{th}$ clock accuracy confidence level (CACL) scaled value indicating a range of reliability of a second oscillator frequency corresponding to the $i^{th}$ second base station from among the plurality of second base stations; and
K=a predetermined numeric value.

5. The method of claim 1, further comprising:
receiving, by the first base station, second frequency information relating to a third base station from among the plurality of base stations and a second indication relating to a second reliability of the second frequency information, and
wherein the calculating comprises:
weighting the frequency information based upon the reliability of the frequency information and the second frequency information based upon the second reliability of the second frequency information; and
calculating the offset frequency value based upon the weighted frequency information.

6. A method for a self-synchronizing network, the self-synchronizing network including a plurality of base stations coupled to One another, the method comprising:
receiving, by a first base station from among the plurality of base stations, frequency information relating to a second base station from among the plurality of base stations using a control channel;
calculating, by the first base station, an offset frequency value based on the frequency information;
adjusting; by the first base station, an oscillator frequency value based on the offset frequency value; and
sending second frequency information relating to the oscillator frequency value to the second base station using the control channel.

7. The method of claim 6, wherein the sending the second frequency information comprises:
sending the second frequency information indicative of a reliability of the oscillator frequency value.

8. The method of claim 6, wherein the sending the frequency information comprises:
sending the second frequency information indicative of the offset frequency value corresponding to the first base station.

9. The method of claim 6, wherein the sending the second frequency information comprises:
sending a self clock accuracy confidence level (SCACL) scaled value indicating a range of reliability of an oscillator frequency corresponding to the first base station.

10. A self-synchronizing network, comprising:
a plurality of base stations coupled to one another, the plurality of base stations being configured to:
communicate frequency information and indications relating to reliabilities of the frequency information with one another; and
update oscillator frequency values corresponding to the plurality of base stations based on the frequency information and the indications.

11. The self-synchronizing network of claim 10, wherein the frequency information includes information selected from a group consisting of:
information indicative of oscillator frequency reliabilities corresponding to the plurality base stations;
information indicative of oscillator frequency offsets corresponding to the plurality of base stations;
base station identity codes;
power control indications;
free running oscillator frequency ranges corresponding to the plurality of base stations; and
oscillator frequencies corresponding to the plurality of base stations.

12. The self-synchronizing network of claim 10, wherein the plurality of base stations is further configured to continuously update the oscillator frequency values.

13. The self-synchronizing network of claim 12, wherein the plurality of base stations is further configured to terminate the updating of the oscillator frequency values after a predetermined time.

14. The self-synchronizing network of claim 10, wherein the plurality of base stations is configured to control radio frequency (RF) power outputs as a function of the reliabilities of the frequency information.

15. The self-synchronizing network of claim 10, wherein the plurality of base stations is configured to communicate the frequency information over a control channel.

16. The self-synchronizing network of claim 10, wherein the plurality of base stations are further configured to weight the frequency information based upon the reliabilities of the frequency information and to calculate the oscillator frequency based on the weighted frequency information.

17. A base station in a self-synchronizing network, the self-synchronizing network including a plurality of base stations, the base station comprising:
an oscillator configured to operate at an oscillator frequency;
a clock generator, coupled to the oscillator configured to adjust the oscillator frequency by an offset frequency value; and a processor, coupled to the oscillator and to the clock generator, configured to:
   generate first information relating to:
      a reliability of the oscillator frequency; and
      the oscillator frequency;
   send the first information to the plurality of base stations;
   receive second information from the plurality of base stations; and
   adjust the oscillator frequency based on the first information and the second information.

18. The base station according to claim 17, wherein the processor is configured to send the first information and to receive the second information using a wireless connection.

19. The base station according to claim 17, wherein the processor is further configured to control a power output of the base station as a function of the first information.

20. The base station according to claim 17, wherein the processor is further configured to:
   store logged information including the first information or the second information;
   access the logged information; and
   adjust the oscillator frequency based on the logged information.

* * * * *

UNITED STATES PATENT AND TRADEMARK OFFICE
CERTIFICATE OF CORRECTION

| | | |
|---|---|---|
| PATENT NO. | : 8,934,891 B2 | Page 1 of 1 |
| APPLICATION NO. | : 13/492134 | |
| DATED | : January 13, 2015 | |
| INVENTOR(S) | : Rafael Carmon | |

It is certified that error appears in the above-identified patent and that said Letters Patent is hereby corrected as shown below:

Title page, Item (57), Abstract, line 8, please replace "updates it clock" with --update its clock--.

In the claims,

Column 15, line 56, please replace "One" with --one--.

Column 16, line 29, please replace "plurality base" with --plurality of base--.

Signed and Sealed this
Twenty-first Day of April, 2015

Michelle K. Lee
*Director of the United States Patent and Trademark Office*